US011495806B2

(12) United States Patent
Jahnke

(10) Patent No.: US 11,495,806 B2
(45) Date of Patent: Nov. 8, 2022

(54) ULTRA HIGH EFFICIENCY FUEL CELL POWER GENERATION SYSTEM

(71) Applicant: FuelCell Energy, Inc., Danbury, CT (US)

(72) Inventor: Fred C. Jahnke, Rye, NY (US)

(73) Assignee: FuelCell Energy, Inc., Danbury, CT (US)

(*) Notice: Subject to any disclaimer, the term of this patent is extended or adjusted under 35 U.S.C. 154(b) by 128 days.

(21) Appl. No.: 16/266,699

(22) Filed: Feb. 4, 2019

(65) Prior Publication Data

US 2020/0251755 A1 Aug. 6, 2020

(51) Int. Cl.
| | |
|---|---|
| *H01M 8/04089* | (2016.01) |
| *H01M 8/04119* | (2016.01) |
| *H01M 8/0668* | (2016.01) |
| *H01M 8/0662* | (2016.01) |
| *H01M 8/14* | (2006.01) |
| *H01M 8/18* | (2006.01) |
| *H01M 8/1233* | (2016.01) |
| *H01M 8/12* | (2016.01) |

(52) U.S. Cl.
CPC ... *H01M 8/04097* (2013.01); *H01M 8/04164* (2013.01); *H01M 8/0668* (2013.01); *H01M 8/0681* (2013.01); *H01M 8/0687* (2013.01); *H01M 8/1233* (2013.01); *H01M 8/145* (2013.01); *H01M 8/186* (2013.01); *H01M 2008/1293* (2013.01); *H01M 2008/147* (2013.01)

(58) Field of Classification Search
CPC ........ H01M 8/04097; H01M 8/04164; H01M 8/0668; H01M 8/0681; H01M 8/145; H01M 8/186; H01M 8/1233; H01M 8/0687; H01M 2008/1293; H01M 2008/147
See application file for complete search history.

(56) References Cited

U.S. PATENT DOCUMENTS

| | | |
|---|---|---|
| 3,094,390 A | 6/1963 | Vander |
| 3,180,813 A | 4/1965 | Wasp et al. |
| 4,849,091 A | 7/1989 | Cabrera et al. |
| 5,071,719 A | 12/1991 | Rostrup-Nielsen et al. |

(Continued)

FOREIGN PATENT DOCUMENTS

| | | |
|---|---|---|
| CA | 1242985 A | 8/1985 |
| CA | 2937948 A | 8/2015 |

(Continued)

OTHER PUBLICATIONS

Campanari et al., "Using MCFC for high efficiency CO2 capture from natural gas combined cycles: Comparison of internal and external reforming", Applied Energy 112 (2013) 772-783.

(Continued)

*Primary Examiner* — Osei K Amponsah
(74) *Attorney, Agent, or Firm* — Foley & Lardner LLP

(57) ABSTRACT

A fuel cell system includes a fuel cell having a cathode and an anode configured to receive a portion of a hhydrocarbon feed and to output an anode exhaust stream comprising carbon dioxide, hydrogen, and water; and an electrolyzer cell having a cathode and an anode. The anode of the electrolyzer cell is configured to receive a first portion of the anode exhaust stream and another portion of the hydrocarbon feed, and to generate a hydrogen stream.

18 Claims, 6 Drawing Sheets

(56) References Cited

U.S. PATENT DOCUMENTS

| | | | |
|---|---|---|---|
| 5,346,613 A | 9/1994 | Lomas et al. | |
| 5,346,778 A * | 9/1994 | Ewan | H01M 8/04089 |
| | | | 429/415 |
| 5,413,878 A | 5/1995 | Williams et al. | |
| 5,711,770 A | 1/1998 | Malina | |
| 5,928,806 A | 7/1999 | Olah et al. | |
| 6,187,465 B1 | 2/2001 | Galloway | |
| 7,070,874 B2 | 7/2006 | Blanchet et al. | |
| 7,150,927 B2 | 12/2006 | Hickey et al. | |
| 7,201,979 B2 | 4/2007 | McElroy et al. | |
| 7,323,270 B2 | 1/2008 | Patel et al. | |
| 7,353,085 B2 | 4/2008 | Rusta-Sallehy et al. | |
| 7,364,810 B2 | 4/2008 | Sridhar et al. | |
| 7,396,603 B2 | 7/2008 | Farooque et al. | |
| 7,422,810 B2 | 9/2008 | Venkataraman et al. | |
| 7,482,078 B2 | 1/2009 | Sridhar et al. | |
| 7,575,822 B2 | 8/2009 | Mitlitsky et al. | |
| 7,704,618 B2 | 4/2010 | Venkataraman et al. | |
| 7,781,112 B2 | 8/2010 | Sridhar et al. | |
| 7,833,668 B2 | 11/2010 | Ballantine et al. | |
| 7,846,599 B2 | 12/2010 | Ballantine et al. | |
| 7,878,280 B2 | 2/2011 | Sridhar et al. | |
| 7,887,971 B2 | 2/2011 | Hickey et al. | |
| 7,901,814 B2 | 3/2011 | Venkataraman et al. | |
| 8,053,136 B2 | 11/2011 | Hickey et al. | |
| 8,071,241 B2 | 12/2011 | Sridhar et al. | |
| 8,071,246 B2 | 12/2011 | Mitlitsky et al. | |
| 8,277,992 B2 | 10/2012 | Mitlitsky et al. | |
| 8,435,689 B2 | 5/2013 | Venkataraman | |
| 8,663,859 B2 | 3/2014 | Mitlitsky et al. | |
| 8,852,820 B2 | 10/2014 | Perry et al. | |
| 9,190,693 B2 | 11/2015 | Sridhar et al. | |
| 9,413,017 B2 | 8/2016 | Bandhauer et al. | |
| 9,478,819 B2 | 10/2016 | Lambrech et al. | |
| 9,722,273 B2 | 8/2017 | Perry et al. | |
| 9,911,989 B2 | 3/2018 | McElroy et al. | |
| 9,947,955 B2 | 4/2018 | Sridhar et al. | |
| 10,096,840 B1 | 10/2018 | Venkataraman et al. | |
| 10,361,442 B2 | 7/2019 | Perry et al. | |
| 10,581,090 B2 | 3/2020 | Ballantine et al. | |
| 2002/0004154 A1 | 1/2002 | Pastula et al. | |
| 2004/0180249 A1 | 9/2004 | Pham et al. | |
| 2004/0185313 A1* | 9/2004 | Halter | H01M 8/186 |
| | | | 429/418 |
| 2004/0202914 A1 | 10/2004 | Sridhar et al. | |
| 2005/0058863 A1 | 3/2005 | Wang et al. | |
| 2005/0112425 A1 | 5/2005 | Hsu | |
| 2005/0123810 A1 | 6/2005 | Balan | |
| 2005/0197743 A1 | 9/2005 | Rusta-Sallehy et al. | |
| 2005/0271914 A1 | 12/2005 | Farooque et al. | |
| 2006/0140823 A1 | 6/2006 | Katikaneni et al. | |
| 2006/0248800 A1 | 11/2006 | Miglin et al. | |
| 2008/0060935 A1 | 3/2008 | Hartvigsen | |
| 2008/0075990 A1 | 3/2008 | Isozaki et al. | |
| 2008/0155984 A1 | 7/2008 | Liu et al. | |
| 2008/0314741 A1 | 12/2008 | Balestrino et al. | |
| 2009/0110989 A1 | 4/2009 | Daly et al. | |
| 2009/0158662 A1 | 6/2009 | Towler | |
| 2009/0226775 A1 | 9/2009 | Jahnke et al. | |
| 2009/0235587 A1 | 9/2009 | Hawkes et al. | |
| 2010/0047641 A1 | 2/2010 | Jahnke et al. | |
| 2010/0215566 A1 | 8/2010 | Lourenco et al. | |
| 2010/0266923 A1 | 10/2010 | McElroy et al. | |
| 2010/0304228 A1 | 12/2010 | Majarov et al. | |
| 2011/0104577 A1 | 5/2011 | Cui et al. | |
| 2011/0189567 A1 | 8/2011 | Venkataraman et al. | |
| 2012/0068661 A1 | 3/2012 | Fracas | |
| 2013/0052548 A1 | 2/2013 | Nedergaard Clausen et al. | |
| 2013/0108936 A1 | 5/2013 | McElroy et al. | |
| 2013/0126038 A1 | 5/2013 | Jamal et al. | |
| 2013/0177824 A1 | 7/2013 | Cui et al. | |
| 2013/0251598 A1 | 9/2013 | Gil et al. | |
| 2013/0260268 A1 | 10/2013 | Shapiro et al. | |
| 2014/0076213 A1 | 3/2014 | Ingram et al. | |
| 2014/0080076 A1 | 3/2014 | Lutz | |
| 2014/0093798 A1 | 4/2014 | Snyder et al. | |
| 2014/0272626 A1 | 9/2014 | Berlowitz et al. | |
| 2014/0272629 A1 | 9/2014 | Berlowitz et al. | |
| 2015/0280265 A1 | 10/2015 | McLarty | |
| 2016/0344045 A1 | 11/2016 | Ishino et al. | |
| 2016/0351930 A1 | 12/2016 | Jahnke et al. | |
| 2018/0261865 A1* | 9/2018 | Jahnke | B01D 53/62 |
| 2020/0161671 A1 | 5/2020 | Ballantine et al. | |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 541 A1 | 10/2013 |
| EP | 0 100 531 | 2/1984 |
| EP | 1 620 906 | 2/2006 |
| EP | 1 665 441 | 6/2006 |
| EP | 2 784 187 A1 | 10/2014 |
| EP | 3 054 519 A1 | 10/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 1020070057131 A | 6/2007 |
| KR | 20110114816 | 10/2011 |
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2010/021997 A2 | 2/2010 |
| WO | WO-2013/029701 A1 | 3/2013 |
| WO | WO-2015/116964 A1 | 8/2015 |
| WO | WO-2015/153064 A1 | 10/2015 |
| WO | WO-2017/087405 A1 | 5/2017 |

OTHER PUBLICATIONS

Hu et al., "Electrochemical performance of reversible molten carbonate fuel cells", International Journal of Hydrogen Energy, vol. 39, Issue 23, Aug. 4, 2014, pp. 12323-12329.

Itou et al., "High Efficiency CO2 Separation and Concentration System by Using Molten Carbonate", Greenhouse Gas Control Technologies—6th International Conference Proceedings of the 6th International Conference on Greenhouse Gas Control Technologies Oct. 2002, Kyoto, Japan Volume, pp. 1331-1334.

Kasai et al., "High Temperature Electrochemical Separation of Carbon Dioxide Using Molten Carbonate", Denki Kagaku, 66, No. 6, 1998, p. 635-640.

Millet et al., "Chapter 2—Water Electrolysis Technologies", Renewable Hydrogen Technologies, 2013.

Moreno et al., International Status of Molten Carbonate Fuel Cell (MCFC) Technology, Jan. 2008.

Non-Final Office Action in U.S. Appl. No. 15/980,291 dated Jun. 22, 2020 (21 pages).

Wang et al., "The intensification technologies to water electrolysis for hydrogen production—A review", Renewable and Sustainable Energy Reviews 29 (2014) 573-588.

(56) References Cited

OTHER PUBLICATIONS

Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Final Office Action in U.S. Appl. No. 15/815,556 dated Apr. 8, 2020 (10 pages).
Third Office Action in JP 2018-116336 dated Dec. 20, 2019, with English translation (9 pages).
International Search Report and Written Opinion in PCT/IB2018/059191 dated Mar. 27, 2019 (20 pages).
Office Action in JP2018-116336 dated Mar. 26, 2019 with English translation (8 pages).
Office Action in JP2018-525557 dated May 24, 2019, with English translation (14 pages).
U.S. Notice of Allowance on U.S. Appl. No. 15/980,305 dated Feb. 14, 2019.
Non-Final Office Action on U.S. Appl. No. 15/815,556 dated Oct. 28, 2019.
Notice of Allowance on U.S. Appl. No. 15/980,356 dated Sep. 24, 2019.
Caprile et al.; Carbon capture: Energy wasting technologies or the MCFCs challenge? International Journal of Hydrogen Energy; 2011;36:10269-77.
Desideri et al.; MCFC-based CO2 capture system tor small scale CHP plants, international journal or Hydrogen Energy. 2012;37: 19295-303.
Extended European Search Report dated Oct. 26, 2018 for EP18182210.7 (8 pages).
Extended European Search Report in EP 15744017.3 dated Aug. 16, 2017 (12 pages).
Extended European Search Report received in EP18182124.0 dated Dec. 7, 2018 (6 pages).
Heidenbrecht et al., Molten Carbonate Fuel Cell (MCFC) with Internal Reforming: model-based analysis of cell dynamics, Chemical Engineering Science, vol. 58, issues 3-6, 2003, pp. 1029-1036.
International Preliminary Report on Patentability issued in corresponding application No. PCT/US2015/013837 dated Aug. 2, 2016.
International Search Report and Written Opinion dated May 6, 2014 in PCT/US2015/013837 (13 pages).
International Search Report and Written Opinion dated Jul. 19, 2017 for PCT/US17/28321 (16 pages).
International Search Report and Written Opinion dated Jul. 26, 2017 in PCT/US17/30230 (13 pages).
International Search Report and Written Opinion for PCT/US16/61981 dated Jan. 19, 2017 (8 pages).
International Search Report and Written Opinion in PCT/IB2018/058968 dated Jan. 23, 2019 (16 pages).
International Search Report and Written Opinion in PCT/US/16/62276, dated Jan. 31, 2017 (8 pages).
International Search Report and Written Opinion in PCT/US16/62069 dated Jan. 27, 2017 (10 pages).
International Search Report and Written Opinion on PCT/US16/62083, dated Jan. 31, 2017, 8 pages.
Kasai, "CO2 Electrochemical Separation by Molten Carbonate Technology," Fuel Chemistry Division Preprints, 2002, 47(1), 69-70.
Non-Final Office Action on U.S. Appl. No. 15/115,186 dated Dec. 31, 2018 (7 pages).
Notice of Preliminary Rejection for KR App;. No. 10-2018-7016035 dated Nov. 12, 2018, with English translation (14 pages).
Notice of Preliminary Rejection for KR Appl. No. 10-2018-7017810 dated Nov. 12, 2018, with English translation (13 pages).
Notice of Preliminary Rejection for KR Appl. No. 10-2018-7017811 dated Nov. 12, 2018, with English translation (13 pages).
Notification of the First Office Action for CN201580009634.6 dated May 4, 2018, with English translation (15 pages).
Office Action for KR 10-2018-7016036 dated Nov. 12, 2018, with English translation (13 pages).
Office Action in JP 2018-116336 dated Sep. 21, 2018, with English translation (7 pages).
Office Action in JP 2018-525361 dated Sep. 21, 2018, with English translation (6 pages).
Office Action issued in JP 2016-549225, dated Sep. 25, 2017, with English translation (9 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages).
Second Office Action issued in CA2937948 dated Jun. 11, 2018 (4 pages).
First Office Action in CN 2016800735683 dated Aug. 3, 2020, with English translation (16 pages).
Amorelli et al., "An experimental investigation into the use of molten carbonate fuel cells to capture CO2 from gas turbine exhaust gases", Energy 29 (2004) 1279-1284.
Filipponi et al., "Use of Molten Carbonate Fuel Cell for CO2 Capture", ECS Transactions, 42 (1) 43-47 (2012).
Non-Final Office Action on U.S. Appl. No. 16/091,001 dated Jun. 18, 2021.
Notice of Allowance in U.S. Appl. No. 15/980,291 dated Mar. 24, 2021.
Translation of Baranov et al., "The Opportunities of Electrochemical Air Regeneration Technology on the Base of Molten Carbonate Fuel Cells", Chemical Industry Today, 9, 3, 2016, 3-14.

* cited by examiner

| Stream No. | 110 | 120 | 130 | 131 | 132 | 148 | 150 | 164 | 220 |
|---|---|---|---|---|---|---|---|---|---|
| Name | Total Fuel | Air | Fuel to SOFC Anode | SOFC Anode out | Anode Out To AGO | MCE Feed | MCE H2 Out | Water Removed | Air Exhaust |
| Molar Flow lbmol/hr | 3.21 | 84.97 | 38.46 | 45.08 | 0.08 | 35.01 | 31.62 | 6.35 | 81.82 |
| Mass flow lb/hr | 51.5 | 2,442.0 | 513.5 | 769.7 | 1.4 | 592.1 | 400.5 | 114.5 | 2,378.8 |
| Temp F | 100° | 59° | 1420° | 1470° | 1470° | 1100° | 1150° | 100° | 306° |
| Pres psia | 450.00 | 14.70 | 16.00 | 15.45 | 15.45 | 16.45 | 16.15 | 0.23 gpm | 15.05 |

| Components | lb-mole/hr | mole % | lb-mole/hr | mole % | lb-mole/hr | mole % | lb-mole/hr | mole % | lb-mole/hr | mole % | lb-mole/hr | mole % | lb-mole/hr | mole % | lb-mole/hr | mole % | lb-mole/hr | mole % |
|---|---|---|---|---|---|---|---|---|---|---|---|---|---|---|---|---|---|---|
| Hydrogen | 0.00 | 0.00 | 0.00 | 0.00 | 16.09 | 41.84 | 12.33 | 27.35 | 0.02 | 27.35 | 11.07 | 31.63 | 14.86 | 46.98 | 0.00 | 0.00 | 0.00 | 0.00 |
| Methane | 3.21 | 100.00 | 0.00 | 0.00 | 3.31 | 8.61 | 0.00 | 0.00 | 0.00 | 0.00 | 0.23 | 0.66 | 0.33 | 1.05 | 0.00 | 0.00 | 0.00 | 0.00 |
| Carbon Monoxide | 0.00 | 0.00 | 0.00 | 0.00 | 1.32 | 3.44 | 2.32 | 5.15 | 0.00 | 5.18 | 2.08 | 5.95 | 1.09 | 3.46 | 0.00 | 0.00 | 0.00 | 0.00 |
| Carbon Dioxide | 0.00 | 0.00 | 0.00 | 0.00 | 2.75 | 7.14 | 5.06 | 11.23 | 0.01 | 11.20 | 4.55 | 12.99 | 2.24 | 7.10 | 0.00 | 0.00 | 3.21 | 3.92 |
| Water | 0.00 | 0.00 | 0.86 | 1.01 | 14.99 | 38.96 | 25.37 | 56.28 | 0.05 | 56.26 | 17.07 | 48.77 | 13.09 | 41.41 | 6.35 | 100.00 | 0.93 | 1.13 |
| Nitrogen | 0.00 | 0.00 | 66.49 | 78.25 | 0.00 | 0.00 | 0.00 | 0.00 | 0.00 | 0.00 | 0.00 | 0.00 | 0.00 | 0.00 | 0.00 | 0.00 | 66.49 | 81.26 |
| Oxygen | 0.00 | 0.00 | 17.62 | 20.74 | 0.00 | 0.00 | 0.00 | 0.00 | 0.00 | 0.00 | 0.00 | 0.00 | 0.00 | 0.00 | 0.00 | 0.00 | 11.20 | 13.69 |
| Total | 3.21 | 100.00 | 84.97 | 100.00 | 38.46 | 100.00 | 45.08 | 100.00 | 0.08 | 100.00 | 35.01 | 100.00 | 31.62 | 100.00 | 6.35 | 100.00 | 81.82 | 100.00 |

Net Kw Produced 232 kw    Electrical Efficiency (LHV) 71.5%

FIG. 2B

ULTRA HIGH EFFICIENCY FUEL CELL POWER GENERATION SYSTEM

BACKGROUND

The present disclosure relates to fuel cell systems for the production of electricity. In particular, the present disclosure relates to a fuel cell system including a high temperature hydrogen purification system which allows recycle of additional anode exhaust, increasing the overall electric power generation to over 70%. The power needed to drive the purification system is mostly offset by additional hydrogen produced.

Fuel cells are devices that are capable of converting chemical energy stored in a fuel, such as a hydrocarbon fuel, into electrical energy through electrochemical reactions. In general, a fuel cell comprises an anode, an electrolyte layer, and a cathode. The electrolyte layer serves to transfer ions between the anode and the cathode, which facilitate reactions within the anode and the cathode to generate electrons for the production of electricity.

Fuel cells are often characterized by the type of electrolyte layer used for the transfer of specific ions. For example, one type of fuel cell is the solid oxide fuel cell (SOFC), which incorporates a solid ceramic electrolyte for the transfer of negatively charged oxygen ions from the cathode to the anode.

During operation of an SOFC, air is supplied to the cathode where oxygen gas reacts with electrons to form negatively charged oxygen ions, which are transferred to the anode through the electrolyte layer. At the same time, a hydrocarbon fuel, such as natural gas, is mixed with steam and is reacted in a reforming process where methane and water react to produce hydrogen gas and carbon dioxide. The hydrogen gas reacts with the oxygen ions transferred by the electrolyte layer, producing the electrons for electricity and completing the electrical circuit. As a byproduct of these reactions, water, carbon dioxide, and residual hydrogen gas are released as an exhaust from the anode. Part of the anode exhaust is typically recycled to the anode along with the hydrocarbon fuel, but the remainder is exported to prevent excessive buildup of carbon dioxide and water in the anode. The exported anode exhaust, which typically contains approximately 10% of the feed, is converted to heat rather than electricity and thus should be minimized to obtain the maximum system electrical efficiency.

In order to recycle and use almost all of the fuel for power generation, the carbon dioxide and water in the anode exhaust must be removed from the gas. Preferably the removal should be done at high temperature, minimizing energy losses due to heat exchanger temperature approaches.

SUMMARY

In certain embodiments, a fuel cell system may include a fuel cell having a cathode and an anode configured to receive a portion of a hydrocarbon feed and to output an anode exhaust stream comprising carbon dioxide, hydrogen, and water; and an electrolyzer cell having a cathode and an anode. The anode of the electrolyzer cell may be configured to receive a first portion of the anode exhaust stream and another portion of the hydrocarbon feed, and to generate a hydrogen stream. In some aspects, the hydrogen stream may include at least 70% hydrogen.

In some aspects, the anode of the electrolyzer cell may be further configured to remove carbon dioxide from the first portion of the anode exhaust stream.

In some aspects, the fuel cell system may further include an anode gas oxidizer configured to oxidize a gas stream to remove carbon dioxide and nitrogen therefrom and to output an oxidized exhaust; a heat exchanger configured to receive an air stream and the oxidized exhaust, and to transfer heat from the oxidized exhaust to the air stream; and a cathode supply line configured to supply a heated air stream output from the heat exchanger to the cathode of the fuel cell.

In some aspects, the gas stream oxidized by the anode gas oxidizer may include a second portion of the anode exhaust stream.

In some aspects, the air stream received by the heat exchanger may include a cathode exhaust stream output by the cathode of the electrolyzer.

In some aspects, at least a portion of the hydrogen stream may be recycled to the anode of the fuel cell.

In some aspects, the fuel cell system may further include a methanation catalyst provided downstream of the electrolyzer cell; and a peaker fuel cell. The methanation catalyst may be configured to react with the hydrogen stream such that carbon monoxide is removed from the hydrogen stream and methane is formed. The peaker fuel cell may be configured to receive the hydrogen stream from which carbon monoxide was removed and to output a peaker fuel cell exhaust stream. The hydrogen stream received by the peaker fuel cell may be substantially carbon monoxide free. The peaker fuel cell exhaust stream may be recycled to the anode of the electrolyzer cell or the fuel cell, exported from the fuel cell system, or a combination thereof.

In some aspects, the fuel cell system may further include a proton-membrane exchange fuel cell configured to receive at least a portion of the hydrogen stream. The proton-membrane exchange fuel cell may be configured to output an exhaust stream (e.g., comprising hydrogen, methane, carbon dioxide, and inerts). The gas stream oxidized by the anode gas oxidizer may include the exhaust stream of the proton-membrane exchange fuel cell.

In some aspects, a third portion of the anode exhaust stream may be recycled and mixed, at a location upstream of an inlet of the anode of the fuel cell, with a fuel gas stream comprising natural gas.

In some aspects, the fuel cell may be a solid oxide fuel cell, and the electrolyzer cell may be a molten carbonate electrolysis cell.

In certain embodiments, a fuel cell system may include a fuel cell having a cathode and an anode configured to output an anode exhaust stream comprising carbon dioxide, hydrogen, and water; and an electrolyzer cell having a cathode and an anode. The anode of the electrolyzer cell may be configured to receive a first portion of the anode exhaust stream and to generate a hydrogen stream. The cathode of the electrolyzer cell may be configured to output an air stream to the cathode of the fuel cell. In some aspects, the fuel cell system may further include an anode gas oxidizer configured to oxidize a gas stream to remove carbon dioxide therefrom and to output an oxidized exhaust; a heat exchanger configured to receive the air stream and the oxidized exhaust; and a cathode supply line. In aspects including the anode gas oxidizer, the heat exchanger, and the cathode supply line, the heat exchanger may be further configured to transfer heat from the oxidized exhaust to the air stream, and the cathode supply line may be configured to supply a heated air stream output from the heat exchanger to the cathode of the fuel cell.

In certain embodiments, a method of operating a fuel cell system to increase an efficiency thereof may include outputting a first portion of an anode exhaust stream comprising carbon dioxide, hydrogen, and water from an anode of a fuel cell to an electrolyzer cell; removing the carbon dioxide and water from the first portion of the anode exhaust stream in an anode of the electrolyzer cell to generate a hydrogen stream and carbonate ions; processing the carbonate ions in a cathode of the electrolyzer cell and outputting an air stream from the cathode of the electrolyzer cell to a cathode of the fuel cell; and oxidizing a gas stream using an anode gas oxidizer to remove carbon dioxide and nitrogen therefrom.

In some aspects of the method, the gas stream oxidized by the anode gas oxidizer may include a second portion of the anode exhaust stream.

In some aspects of the method, the method may further include recycling at least a portion of the hydrogen stream to the anode of the fuel cell.

In some aspects of the method, the method may further include cooling the hydrogen stream; reacting the cooled hydrogen stream with a methanation catalyst to remove carbon monoxide from the hydrogen stream and to form methane; and after removing carbon monoxide from the hydrogen stream, supplying the hydrogen stream to a peaker fuel cell. The hydrogen stream supplied to the peaker fuel cell may be substantially carbon monoxide free.

In some aspects of the method, the method may further include recycling a peaker fuel cell exhaust stream to the anode of the electrolyzer cell or the fuel cell, exporting the peaker fuel cell exhaust stream from the fuel cell system, or a combination thereof.

In some aspects of the method, the method may further include receiving a first portion of the hydrogen stream in a proton-membrane exchange fuel cell; and outputting an exhaust stream (e.g., comprising hydrogen, methane, carbon dioxide, and inerts) from the proton-membrane exchange fuel cell. The gas stream oxidized by the anode gas oxidizer may include the exhaust stream of the proton-membrane exchange fuel cell.

In some aspects of the method, the method may further include recycling a third portion of the anode exhaust stream by mixing, at a location upstream of the anode of the fuel cell, the third portion of the anode exhaust stream with a fuel gas stream comprising natural gas.

In certain embodiments, a fuel cell system may include a fuel cell having a cathode and an anode configured to output an anode exhaust stream comprising carbon dioxide, hydrogen, and water; a molten carbonate electrolyzer cell having a cathode and an anode to remove carbon dioxide and water; and an anode gas oxidizer configured to oxidize and recover the heating value of the small amount of gas stream removed to prevent buildup of any inerts in the gas and excess water therefrom. The anode of the electrolyzer cell may be configured to receive all or a portion of the anode exhaust stream not directly recycled and to generate a hydrogen stream as it electrochemically removes the carbon dioxide and much of the water. The cathode of the electrolyzer cell may be configured to be swept with the air going to the fuel cell cathode to reduce the power required by the electrolyzer and output an air stream with a slightly higher oxygen content which then goes to the cathode of the fuel cell.

In some aspects, the hydrogen stream from the electrolyzer may be of lower purity (e.g., 70% to 90%) hydrogen to minimize the electrolyzer power.

In some aspects, at least a portion of the hydrogen stream may be recycled to the anode of the fuel cell.

In some aspects, the hydrogen may be exported from the system as a co-product, and the hydrogen stream may contain 90 to 98% hydrogen.

In one aspect, the fuel cell system may further include a methanation catalyst provided downstream of the electrolyzer cell on part or all of the hydrogen, and a low temperature peaker fuel cell. The methanation catalyst may be configured to react the hydrogen and carbon monoxide in the stream such that carbon monoxide is removed from the hydrogen stream and methane is formed. Removal of carbon monoxide may be required for proper operation of the peaker fuel cell. As the gas is cooled, water may be removed from the system via condensation and separation. The peaker fuel cell may be configured to receive the hydrogen stream to generate load following power and to output a peaker fuel cell exhaust stream. The hydrogen stream received by the peaker fuel cell may be substantially carbon monoxide free. A portion of the peaker fuel cell exhaust stream may be recycled to the anode of the electrolyzer cell or the fuel cell anode. A portion of the peaker fuel cell exhaust stream may be exported often via the anode gas oxidizer to prevent the buildup of inerts (mainly $N_2$) in the system. The anode gas oxidizer may be used to recover the chemical energy in the peaker fuel cell exhaust stream. The peaker cell may be a proton-membrane exchange fuel cell.

In some aspects, the electrolyzer may be operated to produce a higher purity hydrogen stream (e.g., greater than 90% hydrogen) when the hydrogen is fed to a peaker cell after methanation. In some aspects, more than one electrolyzer may be used, for example, at least one electrolyzer configured to generate a high purity hydrogen stream for the peaker cell, and at least one electrolyzer configured to generate a lower purity hydrogen stream (e.g., 70% or more and less than 90% hydrogen) for direct recycle to the fuel cell.

In some aspects, the fuel cell system may further include a cathode exhaust stream output from the cathode of the fuel cell. At least a portion of the cathode exhaust stream may be supplied to the anode gas oxidizer.

In some aspects, the fuel cell may be a solid oxide fuel cell.

These and other advantageous features will become apparent to those reviewing the disclosure and drawings.

BRIEF DESCRIPTION OF THE DRAWINGS

FIG. 2B is a data table providing a heat and material balance calculated for the system of FIG. 2A.

Figure 4:
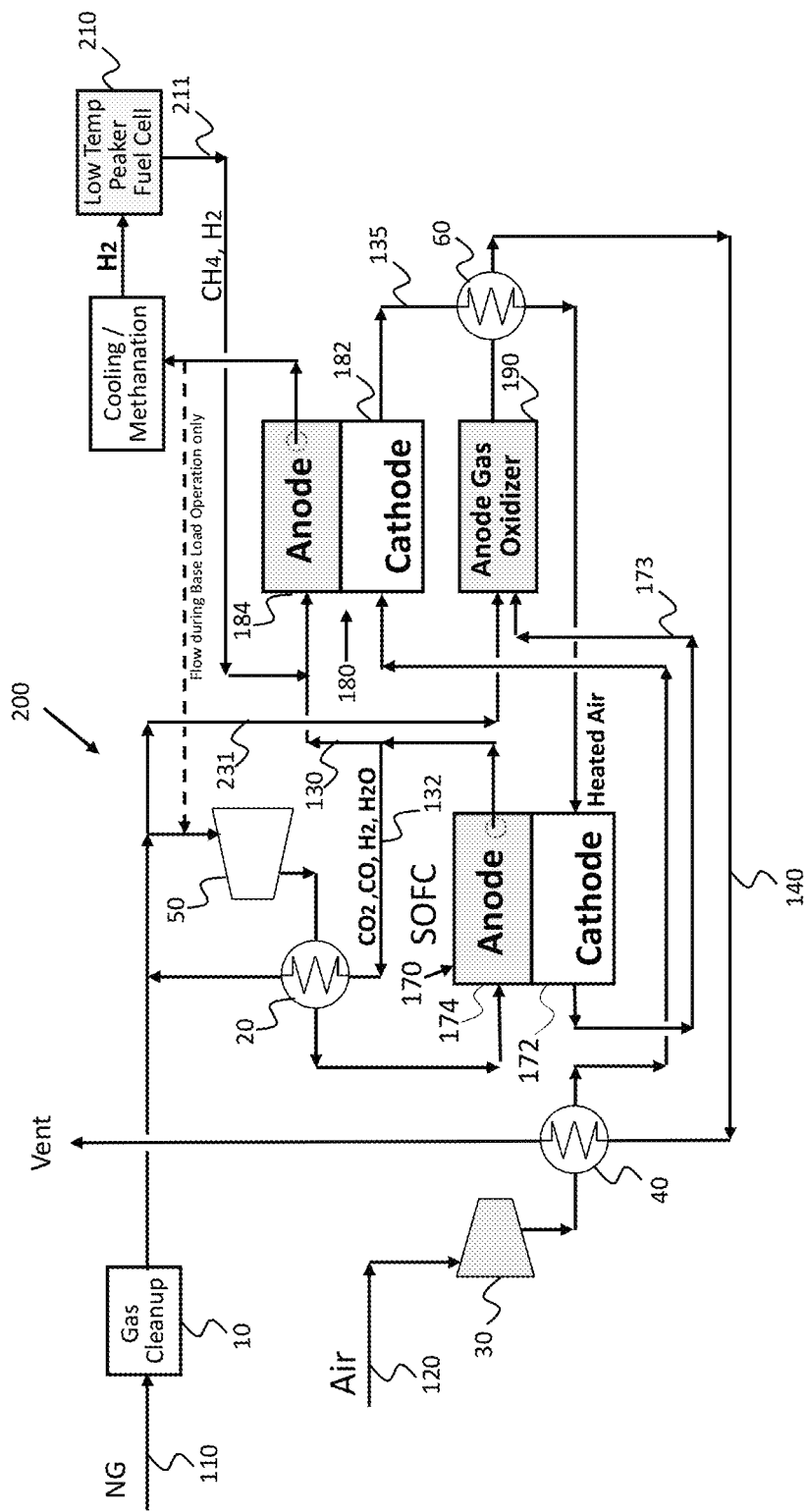

FIG. 4 shows a schematic view of fuel cell system for load following peak power generation which maintains a base load operation of the high temperature SOFC fuel cell and includes a solid oxide fuel cell, a hydrogen purification system in the form of a molten carbonate electrolyzer, and an anode gas oxidizer which is fed a small portion of the anode exhaust to prevent build-up in inerts, and a low temperature peaker fuel cell according to another embodiment of the present invention.

Figure 5:
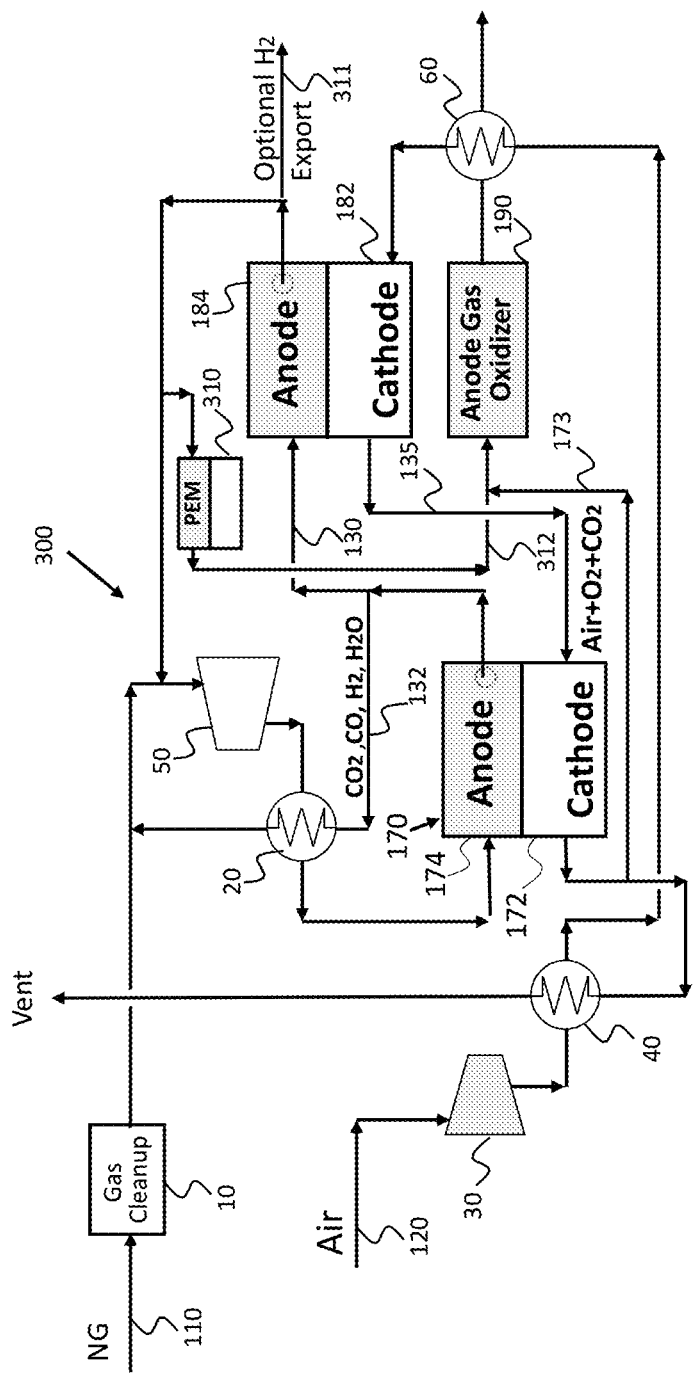

FIG. 5 shows a schematic view of fuel cell system including a solid oxide fuel cell, a hydrogen purification system in the form of a molten carbonate electrolyzer, a proton-exchange membrane fuel cell and an anode gas oxidizer which is fed the PEM anode exhaust to prevent build-up in inerts and water according to another embodiment of the present invention.

DETAILED DESCRIPTION

Referring generally to the figures, disclosed herein are fuel cell power systems including a hydrogen purification system to maximize fuel utilization. The systems allow for the production of power from natural gas at very high efficiency (>70% electrical efficiency) and zero water consumption. The production of power is also scalable to produce as little or as much power as needed at a site without any loss in efficiency.

Figure 1:
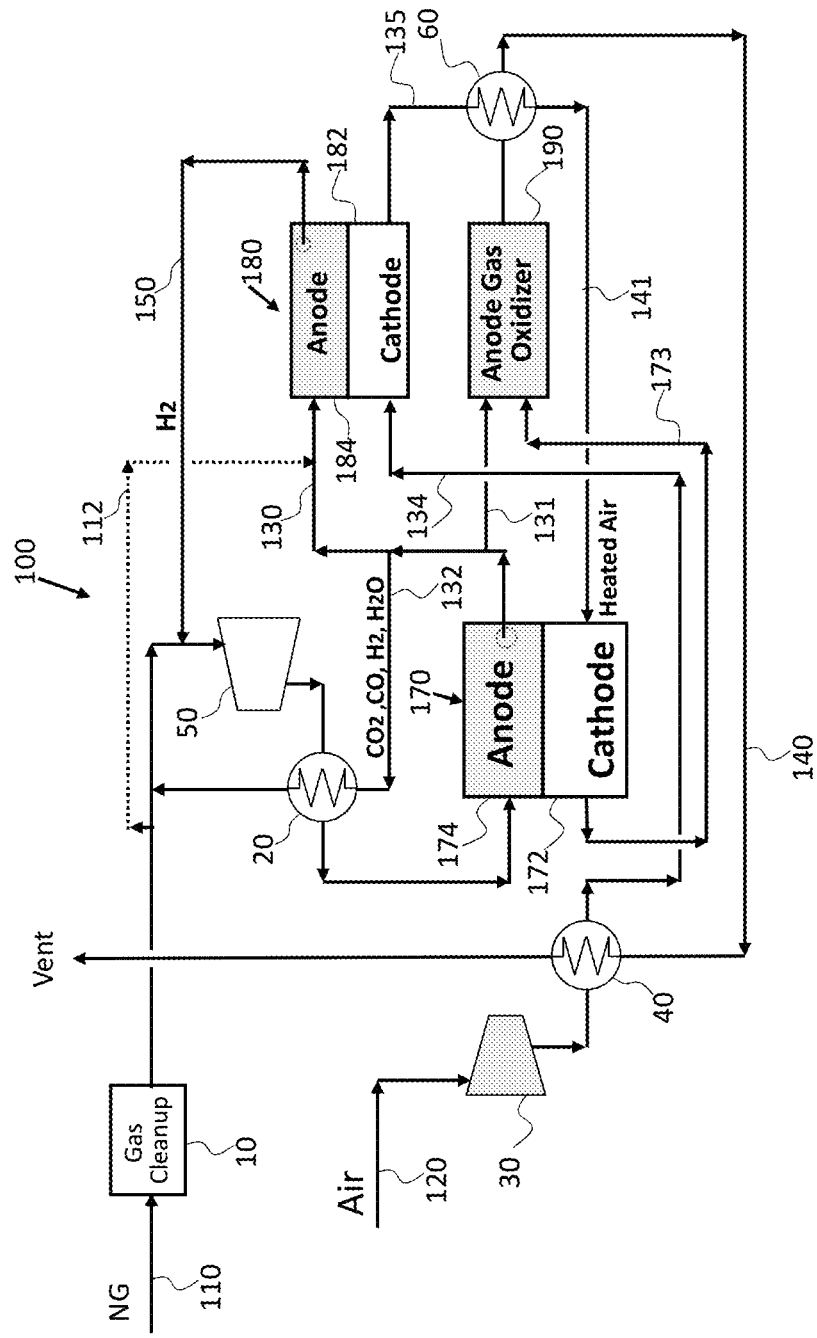
FIG. 1 shows a schematic view of a fuel cell system including a solid oxide fuel cell, a hydrogen purification system in the form of a molten carbonate electrolyzer, and an anode gas oxidizer which is fed a small portion of the anode exhaust to prevent build-up in inerts, according to one embodiment of the present invention.

FIG. 1 shows a fuel cell system 100 which includes a hydrogen purification system 180 for removing carbon dioxide and water from an anode exhaust stream produced by a fuel cell 170. As shown in FIG. 1, a hydrocarbon fuel (a fuel gas), such as natural gas, is supplied to the system 100 through a fuel supply line 110. The fuel stream is first directed through a gas cleanup station 10, which removes impurities contained in the fuel stream that may be harmful to the fuel cell 170. The cleaned fuel stream is then mixed with an anode exhaust recycle stream from an anode 174 of a fuel cell 170, which is supplied by a return line 132 and will be described in more detail below. The anode exhaust recycle stream contains carbon dioxide, carbon monoxide, hydrogen and water. The water is provided to the fuel stream to prevent carbon formation (e.g., soot formation) when the fuel is heated up to high temperature. In the embodiment shown in FIG. 1, the fuel cell 170 is configured as a solid oxide fuel cell (SOFC). The fuel cell 170 may be capable of internally reforming the mixed fuel stream by converting methane and water to hydrogen and carbon dioxide. Alternatively, the system 100 may incorporate an external reformer to reform the mixed fuel stream before being introduced into the fuel cell 170. In addition, the fuel cell 170 may comprise a plurality of unit cells connected to form a fuel cell stack.

The mixed fuel stream, containing the hydrocarbon fuel (the fuel stream) and the anode exhaust recycle stream, is directed through the fuel supply line 110 by a first blower 50, where, after being heated by a first heat exchanger 20, the mixed fuel stream is supplied to the anode 174 of the SOFC 170 to facilitate the electrochemical reactions needed for the production of electricity.

As further shown in FIG. 1, an air stream is supplied to the system 100 through an air supply line 120, where it is directed by a second blower 30 through a second heat exchanger 40. The air stream is heated by the second heat exchanger 40 and continues through a hydrogen purifier in the form of a molten carbonate electrolyzer (MCE) cathode supply line 134 to an MCE 180. Sweeping the MCE cathode (with the air stream) dilutes the CO2/O2 in the MCE cathode which reduces the electrolyzer power required on the order of 10%. As discussed in further detail below, the MCE 180 is a high temperature hydrogen purification system. In addition, in this configuration, the hydrogen purity from the MCE is low, around 80%, to again reduce the electrical power required in the MCE purifier.

At the anode 174, an anode exhaust stream is produced. The anode exhaust stream largely contains carbon dioxide, water, and unreacted hydrogen and carbon monoxide gas, which is carried from the anode 174 and split into three streams that flow through a hydrogen purifier supply line 130 (first portion of the anode exhaust stream), an anode gas oxidizer (AGO) supply line 131 (second portion of the anode exhaust stream), and a recycle line 132 (third portion of the anode exhaust stream) to be mixed with the fuel stream supplied by the fuel supply line 110.

Figure 3:
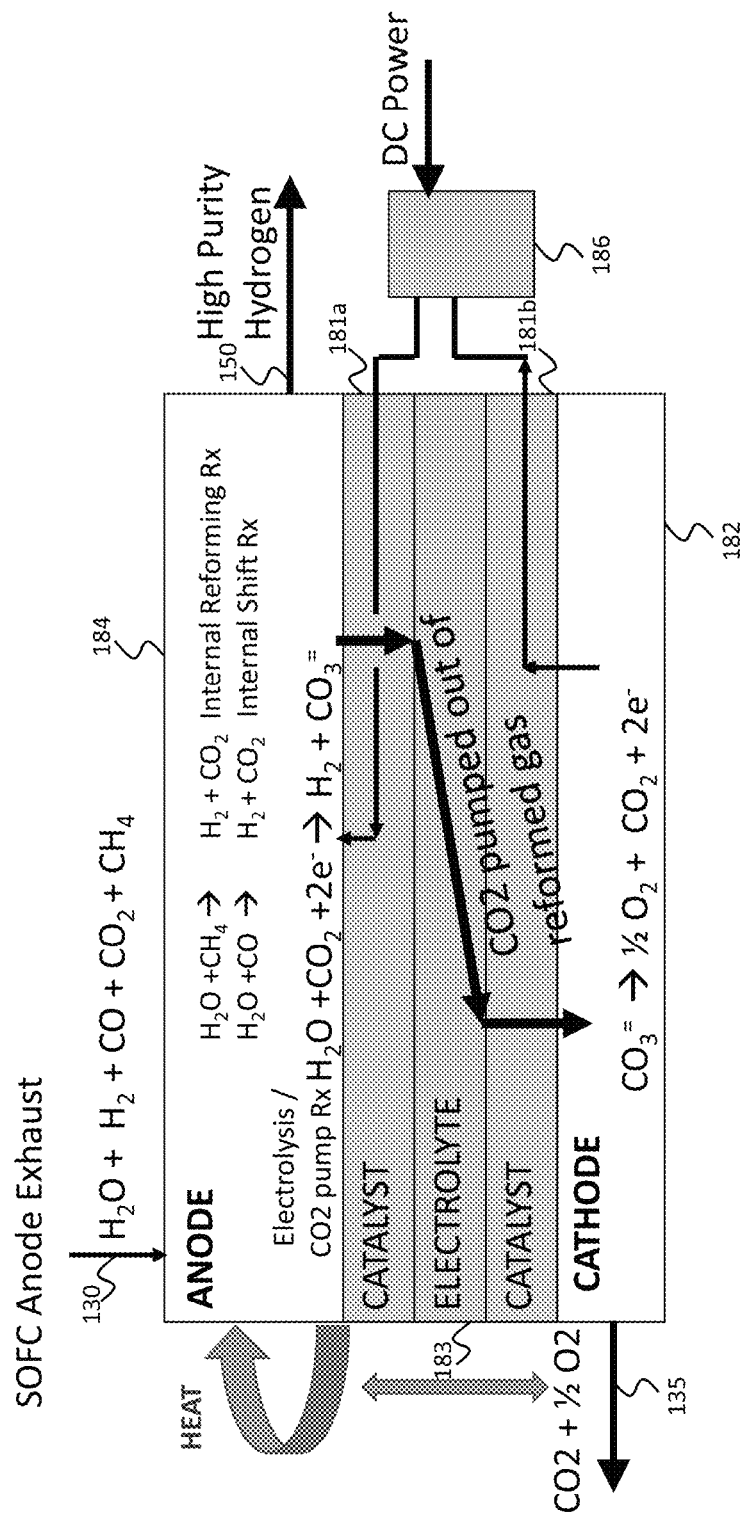
FIG. 3 shows a detailed, schematic view of the molten carbonate electrolyzer used in the fuel cell system of FIG. 1 which removes $CO_2$ and water by converting them to $H_2$ and $CO_3^{2-}$ and removing the carbonate ion electrochemically by applying power to the cell.

FIG. 3 shows a detailed, schematic view of the MCE 180. The MCE 180 is capable of purifying the anode exhaust hydrogen by removing carbon dioxide and water. This allows more of the hydrogen in the anode exhaust to be recycled to produce power, reducing the fuel required and increasing the efficiency. An example of an MCE system is described in greater detail in International Patent Application No. PCT/US2015/013837, which is incorporated by reference herein in its entirety. In the embodiment shown in FIG. 3, the MCE 180 is operated as an electrolyzer cell, such as a molten carbonate electrolysis cell (MCEC). The high temperature electrolysis process is highly efficient, producing hydrogen at less than 33 kwh/kg $H_2$ as compared to 45 to 60 kwh/kg for low temperature electrolyzers. In fact, by operating the MCE to produce low purity $H_2$ (approximately 80% $H_2$ on dry mole % basis) and sweeping the cathode with air, the power consumption may be reduced to below 30 kwh/kg. The MCE 180 may comprise a plurality of individual cells to form an MCE stack. As shown in FIG. 3, the MCE 180 generally comprises the anode 184, which includes a catalyst layer 181a, an electrolyte layer 183, the cathode 182, which includes a catalyst layer 181b, and a power supply 186 configured to apply a voltage to the anode 184 and cathode 182.

Referring to FIG. 1, the anode exhaust stream from the SOFC 170 is supplied to the anode 184 through the MCE anode supply line 130. The anode exhaust stream largely contains water, hydrogen, carbon dioxide, and small amounts of carbon monoxide and methane. In some embodiments, a small amount of additional methane may optionally be added to the exhaust stream supplied to the MCE 180 through a methane supply line 112 to obtain the desired heat balance in the MCE system. Adding additional methane via the methane supply line 112 is optional such that some embodiments may include the methane supply line 112, some embodiments may not include the methane supply line 112, and some embodiments may include but not always utilize the methane supply line 112. During an internal reforming reaction driven by the catalyst layer 181a, water reacts with any methane to produce hydrogen and carbon dioxide in a reversible reaction determined by equilibrium. Because the methane contained in the anode exhaust stream is present in very low residual amounts (e.g., less than 0.01%) due to the reforming reaction that occurred in the high temperature SOFC 170, reforming of the anode exhaust stream to produce methane may occur in the MCE which releases heat and can cause the MCE to heat up to a higher temperature than desired. Adding the proper small amount of methane to the MCE feed prevents additional methane generation, reducing the heat release in the MCE and a more even temperature profile. In addition, during an internal gas-shift reaction, water reacts with carbon monoxide to produce additional hydrogen and carbon dioxide.

As further shown in FIG. 3, during an electrolysis/$CO_2$ pump reaction, water, carbon dioxide, and electrons supplied by the power supply 186 react to produce hydrogen, carbonate ions $CO_3^{2-}$, and residual heat. The residual heat facilitates the internal reforming and gas-shift reactions described above. The hydrogen produced by the reactions in the anode 184 is purified by the transfer of almost all of the carbon from the feed gas 110 as carbonate ions flowing to the cathode 182 across the electrolyte layer 183. The hydrogen gas is removed as a hydrogen stream from the MCE 180 through a hydrogen recycle line 150, which is recycled to the fuel supply line 110 upstream of the first blower 50. The hydrogen stream mixes with the mixed fuel stream, containing the hydrocarbon fuel (the fuel stream) and the anode exhaust recycle stream prior to being supplied to the first blower 50. Operation of the MCE 180 may be varied to adjust a purity of the hydrogen in the hydrogen stream. In some embodiments, the hydrogen stream comprises at approximately 70% or more hydrogen (e.g., 80% of more hydrogen, 90% or more hydrogen, 70%-90% hydrogen, 90%-98% hydrogen, or any other range of hydrogen from 70% to 100%). The purity of the hydrogen stream may be selected to minimize power of the MCE 180.

Efficiency of the system is improved by recycling more of the anode exhaust hydrogen which is made possible by removing the carbon dioxide in the anode exhaust stream to prevent carbon dioxide buildup. In particular, in the MCE 180, carbon dioxide and water are removed from the anode exhaust stream. The MCE 180 separates the carbon dioxide from the hydrogen in the anode exhaust stream, thereby allowing the hydrogen to be fully recycled. At the same time, the MCE 180 generates additional hydrogen from the reaction $CO_2 + H_2O \rightarrow H_2 + CO_3^{2-}$ as carbonate ions are transferred electrochemically. The power generated from the produced hydrogen and the additional hydrogen recycled is more than the power used by the MCE 180, increasing system electrical efficiency.

As noted above, the air stream heated by the second heat exchanger 40 is supplied to the cathode 182 of the MCE 180 via the MCE cathode supply line 134. This air dilutes the carbon dioxide and oxygen mixture produced by the MCE and reduces the voltage and power consumed in the MCE. Carbonate ions produced by the electrolysis/$CO_2$ pump reaction are transferred from the anode 184 to the cathode 182 via the electrolyte layer 183. At the cathode 182, the carbonate ions separate to produce oxygen, carbon dioxide, and electrons. These electrons complete the circuit with the power supply 186 and return to the anode 184. The oxygen and carbon dioxide produced from the carbonate ions are removed from the MCE 180 through an MCE cathode exhaust line 135. Thus, the transfer of the carbonate ions together with the subsequent reaction at the cathode 182 has the effect of pumping carbon dioxide together with oxygen gas out of the anode exhaust stream.

As shown in FIG. 1, the MCE cathode exhaust line 135 carries the MCE exhaust stream (an air stream containing additional oxygen and carbon dioxide) to a third heat exchanger 60. The heated air stream is supplied to a cathode 172 of the SOFC 170 through a cathode supply line 141. The SOFC will have a slightly better performance due to the higher oxygen content in the air 135 from the MCE as compared to atmospheric air 120. The mixed fuel stream supplied to the anode 174 and the air stream supplied to the cathode 172 facilitate internal reactions that result in the transfer of negatively charged oxygen ions across the solid oxide electrolyte layer of the SOFC 170 such that electricity may be produced. After completion of the reactions, the cathode 172 outputs a cathode exhaust stream containing oxygen-depleted air.

The cathode exhaust stream is supplied to the AGO 190 via a second AGO supply line 173. Here, the oxygen contained within the cathode exhaust stream (supplied via the second AGO supply line 173) facilitates the oxidation of the anode exhaust stream (supplied via the AGO supply line 131) such that any inerts in the fuel feed (typically, a small amount of $N_2$), along with residual carbon dioxide and water, may be removed from the system 100 via a removal line 140 in the form of an AGO exhaust stream. After the AGO exhaust stream is oxidized to release the chemical energy of any $H_2$ in the stream, heat from the stream is recovered by the third exchanger 60 and/or the second heat exchanger 40 and vented from the system 100.

Generating power at very high efficiency using the system of FIG. 1 is one way to reduce global warming $CO_2$ gas at a low cost. The portion of the anode exhaust stream supplied to the AGO supply line 131 helps prevent the buildup of inerts in the system. However, supplying the anode exhaust stream to the AGO 190 also reduces efficiency of the AGO 190 and thus is minimized. In conventional systems in which all of the $CO_2$ in the anode exhaust stream is removed via the anode exhaust to the AGO, this stream is much greater the overall efficiency of the SOFC 170 is about 63%. In contrast, in the system of FIG. 1, nearly 100% of the hydrocarbon fuel supplied to the fuel cell 170 is used to generate power, thereby increasing efficiency of the system to greater than 70%, even after accounting for the power used by the MCE 180. As noted above, the MCE 180 allows the system to recycle almost all of the hydrogen from the anode exhaust stream, which is normally burned in the AGO 190 to prevent excess carbon dioxide build-up in the anode side of the fuel cell. This high efficiency is possible since the power produced from the higher fuel utilization and hydrogen produced from water in the MCE is greater than all of the power used by the MCE 180.

Adding or subtracting cells in a stack including a plurality of SOFCs 170, or in the MCE 180 would allow for modular power production systems that generate 20 to 2000 kilowatts. As a non-limiting example, a 200 kW power production system would coproduce around 70 kg per day of hydrogen.

Figure 2A:
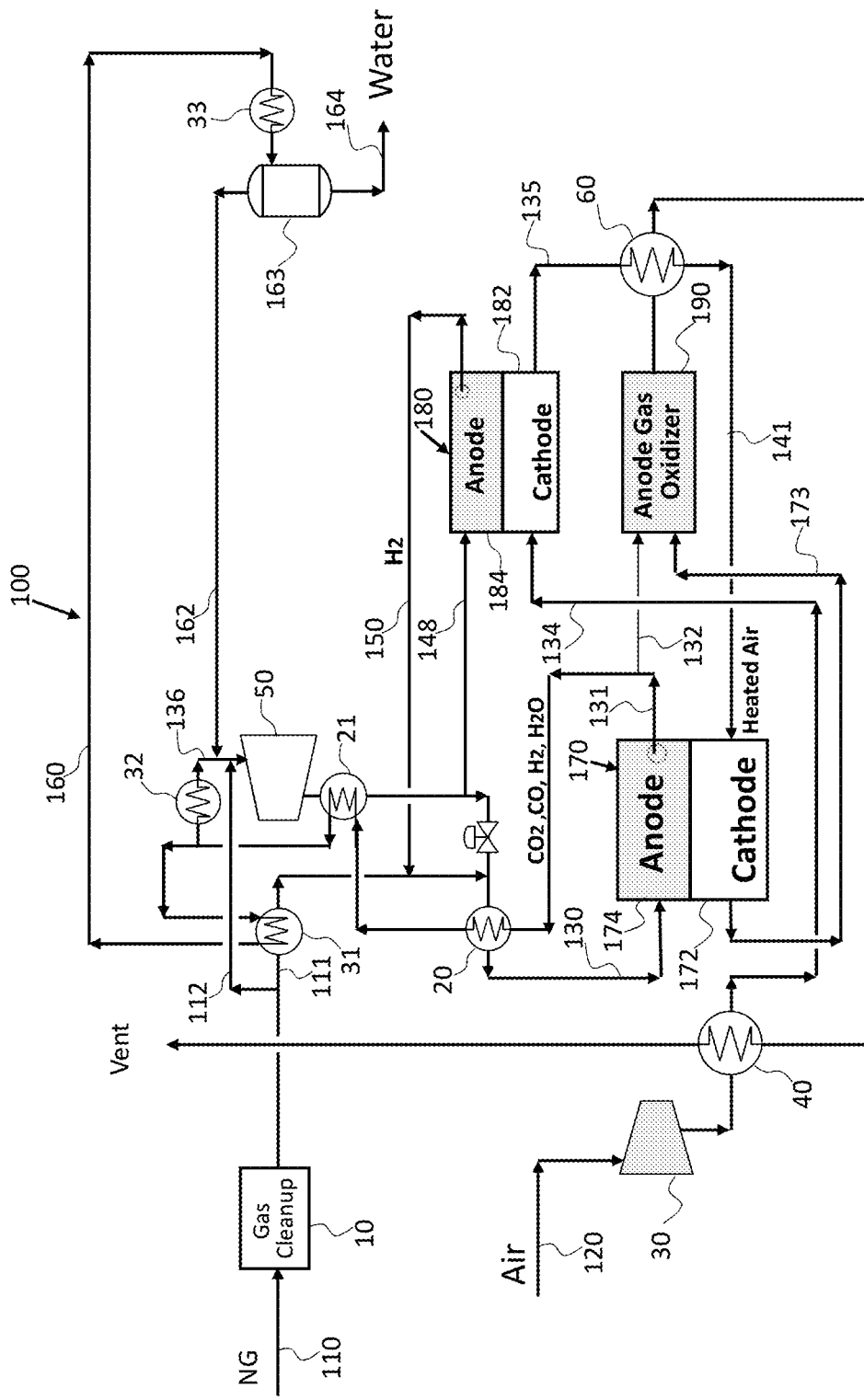
FIG. 2A is similar to FIG. 1, and shows a schematic view of a fuel cell system including a solid oxide fuel cell, a hydrogen purification system in the form of a molten carbonate electrolyzer, and an anode gas oxidizer, but also includes excess water removal via condensation in addition to blowdown to the AGO, according to one embodiment of the present invention. The flow scheme is also slightly more complex, but provides a better pressure balance in the system.

FIG. 2A shows the same operation as FIG. 1 except the hydrogen purifier is located downstream of the anode exhaust blower and a water removal system is included. Also, a heat and material balance HMB was calculated for this case as shown in FIG. 2B.

In FIG. 2A, part of the pressurized anode exhaust from blower 50 including part of the NG fuel 110 is heated to the MCE operating temperature in exchanger 21 and then sent to the MCE anode 184. By adjusting the amount of NG in the feed to the MCE, a good temperature profile and heat balance can be maintained in the MCE. Part of the anode exhaust may be recycled more directly to the SOFC. The higher purity $H_2$ 150 from the MCE 180 is then heated further in exchanger 20 and sent to the SOFC anode. $CO_2$ and $O_2$ from the MCE cathode 182 is mixed with preheated air in the cathode and is sent to the SOFC.

Part of the SOFC anode exhaust is cooled below the dewpoint to remove excess water from the system. It is first cooled by preheating part of the feed fuel in exchanger 32 and then further cooled in an airfan or cooling water exchanger 33 and then the condensed water is separated in knock out drum 163 and exported. The other part of the SOFC anode exhaust is cooled in an airfan or cooling water exchanger 32 and recycled back with no water removal via blower 50. The water balance in the system is controlled by controlling the anode exhaust split between exchangers 31 and 32. In some embodiments, heat exchanger 32 may be located downstream of heat exchanger 31 and the anode exhaust split to blower 50 and water separator 163 may be located after exchanger 32.

Referring to FIG. 4, in another embodiment, a system 200 similar to the system 100 of FIG. 1 may be used to generate peak power. The main difference between the system 100 and the system 200 is that the system 200 includes a low temperature peaker fuel cell 210 configured to increase the net power produced and to follow the load of the electric demand of the grid system and maintain the grid system's generation-to-load balance. The low temperature peaker fuel cell 210 may be, for example, a proton-exchange membrane (PEM) fuel cell which can rapidly change power production.

The system 200 further differs from the system 100 in that the hydrogen stream output from the MCE 180 is a higher purity (normally at least 95% $H_2$ dry) when peak power is produced. Only the excess hydrogen is recycled to the fuel supply line 110 with full recycle (100% of the hydrogen) sent to the fuel supply line 110 only during base load operation when no power is produced from the peaker fuel cell. During peak power production, additional natural gas feed is used to offset the fuel sent to the peaker. During base load operation, the MCE may be operated to produce a hydrogen stream in which relatively low purity hydrogen (approximately 80%) to minimize the power consumption of the MCE 180 and the methanator is bypassed.

During peak power operation, the MCE 180 may be operated to produce a high purity hydrogen stream (e.g., at least 95% hydrogen, for example, 98% hydrogen). Instead of recycling all the hydrogen stream output from the MCE 180 to the fuel supply line 110, part or all of the high purity hydrogen stream output from the MCE 180 is cooled and the carbon monoxide is removed by reacting the carbon monoxide with hydrogen to form methane and water via the following methanation reaction:

$$CO+3H_2 \rightarrow CH_4+H_2O \quad (1)$$

At the same time, carbon dioxide in the stream will also be converted via the following methanation reaction:

$$CO_2+4H_2 \rightarrow CH_4+2H_2O \quad (2)$$

These reactions consume hydrogen and producing higher purity hydrogen (lower $CO+CO_2$) from the MCE 180 is desirable to minimize the hydrogen converted back to methane and unavailable for the peaker operation.

The carbon monoxide free hydrogen that is produced during methanation is supplied to an anode of the low temperature peaker fuel cell 210 along with the methane. Removal of carbon monoxide is normally required for proper operation of the peaker fuel cell. As the gas is cooled, water may be removed from the system via condensation and separation. Methane acts as an inert in the low temperature peaker fuel cell and a blowdown stream 211 is used to prevent excess methane buildup. Unreacted methane and excess hydrogen output from the low temperature peaker fuel cell 210 are recycled to the MCE 180 through a peaker exhaust line 211. The peaker exhaust line 211 and the MCE anode supply line 130 converge upstream of the MCE 180 such that the anode exhaust stream in the MCE anode supply line 130 and the unreacted methane and excess hydrogen in the peaker exhaust line 211 are combined prior to being supplied to the anode 184 of the MCE 180. A portion of the peaker fuel cell exhaust stream (comprising, for example, unreacted methane, hydrogen, and inerts) may be exported via the anode gas oxidizer to prevent the buildup of inerts (mainly $N_2$) in the fuel cell system.

Generally when the hydrogen is exported or used in a peaker fuel cell, the MCE 180 may be operated to produce a higher purity hydrogen stream (e.g., 90% or greater hydrogen, for example, approximately 98% hydrogen). In certain embodiments, more than one electrolyzer (e.g., MCE) may be used to generate a high purity hydrogen stream for a peaker fuel cell and a lower purity hydrogen stream (e.g., greater than or equal to 70% hydrogen and less than 90% hydrogen) for direct recycle to the fuel cell 170 (e.g., SOFC).

The benefit of the system is that it allows load following, peak power production without hydrogen storage. Although the efficiency of the system will be lower, it should stay above 60% electrical efficiency which is very high for a peak power production system.

Referring to FIG. 5, in another embodiment, a system 300 similar to the system 100 of FIG. 1 may be used to generate additional power or export hydrogen. The MCE will remove all carbon dioxide from the system, however, there is the potential for excess water to build up if a water removal system such as shown in FIG. 2A is not employed and a blowdown of the $H_2$ can be used to prevent this. This blowdown will also remove trace inerts, such as $N_2$ or Ar, which may be included in the natural gas feed and for systems with natural gas feed with high inerts, substantial blowdown may be required even with a water removal system. While this blowdown may be sent directly to the anode gas oxidizer (AGO) as shown if FIG. 1, it may be preferable to send the blowdown through a PEM fuel cell to generate additional power as shown is FIG. 4 before sending the blowdown to the AGO. This increases the amount of fuel converted to electricity, increasing the system efficiency. Since PEM fuel cells can easily load follow, the system would also add some load following capability to the overall system. Alternately, the hydrogen could be exported for other purposes to remove water and inerts.

For use as feed to a PEM fuel cell or for export, a relatively high purity hydrogen is desirable. For recycle to the SOFC fuel cell, a relatively low purity hydrogen is desirable to minimize purification power consumption. By proper manifold design and flow control, one can produce both high purity and low purity hydrogen from a single MCE stack as shown in FIG. 4. Alternately two separate MCE systems could be used.

The system 300 includes a PEM fuel cell 310. The hydrogen stream output from the MCE 180 may be split into three streams: a first stream supplied to the PEM fuel cell 310, a second stream supplied to a hydrogen export line 311, and a third stream supplied to the fuel supply line 110 and recycled to the SOFC fuel cell. The hydrogen export line 311 may lead to a hydrogen storage or may be further purified and/or exported from the system 300 (e.g., for use as transportation fuel or industrial uses).

In the system 300, the AGO 190 does not receive a portion of the SOFC anode exhaust stream directly. The anode exhaust stream is split into two streams: one stream that flows through the MCE anode supply lines 130/130a and another stream that flows through the return line 132 to be mixed with the fuel stream supplied by the fuel supply line 110. The anode exhaust sent to the MCE is purified, reducing the $CO_2$ and water content in the exhaust. The portion of the anode exhaust used to prevent buildup of inerts in the system is sent to the MCE through supply line 130 and is purified to a high hydrogen level, 95 to 98% hydrogen. This stream of hydrogen plus inerts is exported or sent to the PEM fuel cell 310 where most of the hydrogen is converted into additional power. An exhaust stream of the PEM fuel cell 310, which is low in hydrogen content and high in inerts, is supplied to the AGO 190 via an AGO supply line 312.

In each of the embodiments described above, by incorporating an electrolyzer cell (e.g., an MCE) into a fuel cell system, a stream with high hydrogen content can be produced by removing carbon dioxide and water. This allows more of the hydrogen in the very low purity anode exhaust of a fuel cell (e.g., a SOFC) to be recycled to the fuel cell and converted into electrical power. Using the purified anode exhaust to generate power increases the efficiency of the system (e.g., more fuel is converted into power), which allows the fuel cell system to achieve an overall electrical efficiency greater than 70%. Thus, a fuel cell system may be provided where clean, reliable energy is supplied and the high efficiency reduces harmful $CO_2$ emissions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fuel cell system comprising:
   a fuel cell having a cathode and an anode configured to receive a portion of a hydrocarbon feed and to output an anode exhaust stream comprising carbon dioxide, hydrogen, and water; and
   an electrolyzer cell having a cathode and an anode, wherein the anode of the electrolyzer cell is configured to receive a first portion of the anode exhaust stream and another portion of the hydrocarbon feed, and to generate a hydrogen stream;
   a methanation catalyst provided downstream of the electrolyzer cell; and
   a peaker fuel cell, wherein:
   the methanation catalyst is configured to react with the hydrogen stream such that carbon monoxide is removed from the hydrogen stream and methane is formed;
   the peaker fuel cell is configured to receive the hydrogen stream from which carbon monoxide was removed and to output a peaker fuel cell exhaust stream; and
   the peaker fuel cell exhaust stream is recycled to the anode of the electrolyzer cell or the fuel cell, is exported from the fuel cell system, or a combination thereof.

2. The fuel cell system according to claim 1, wherein the anode of the electrolyzer cell is further configured to remove carbon dioxide from the first portion of the anode exhaust stream.

3. The fuel cell system according to claim 1, further comprising:
   an anode gas oxidizer configured to oxidize a gas stream comprising a second portion of the anode exhaust stream and to output an oxidized exhaust;
   a heat exchanger configured to receive an air stream and the oxidized exhaust, and to transfer heat from the oxidized exhaust to the air stream; and
   a cathode supply line configured to supply a heated air stream output from the heat exchanger to the cathode of the fuel cell.

4. The fuel cell system according to claim 3, wherein the air stream received by the heat exchanger comprises a cathode exhaust stream output by the cathode of the electrolyzer cell.

5. The fuel cell system according to claim 3, wherein the hydrogen stream comprises at least 70% hydrogen.

6. The fuel cell system according to claim 5, wherein at least a portion of the hydrogen stream is recycled to the anode of the fuel cell.

7. The fuel cell system according to claim 1, wherein a third portion of the anode exhaust stream is recycled and mixed, at a location upstream of an inlet of the anode of the fuel cell, with a fuel gas stream comprising natural gas.

8. The fuel cell system according to claim 1, wherein:
   the fuel cell is a solid oxide fuel cell, and
   the electrolyzer cell is a molten carbonate electrolysis cell.

9. A fuel cell system comprising:
a first fuel cell having a cathode and an anode configured to output an anode exhaust stream comprising carbon dioxide, hydrogen, and water;
a proton-exchange membrane fuel cell;
an anode gas oxidizer; and
an electrolyzer cell having a cathode and an anode, wherein:
the anode of the electrolyzer cell is configured to receive a first portion of the anode exhaust stream and to generate a hydrogen stream;
the proton-exchange membrane fuel cell is configured to receive at least a portion of the hydrogen stream and to output an exhaust stream;
the anode gas oxidizer is configured to oxidize a gas stream comprising the exhaust stream of the proton-exchange membrane fuel cell and to output an oxidized exhaust; and
the cathode of the electrolyzer cell is configured to output an air stream to the cathode of the first fuel cell.

10. The fuel cell system according to claim 9, further comprising:
a heat exchanger configured to receive the air stream and the oxidized exhaust; and
a cathode supply line, wherein:
the heat exchanger is further configured to transfer heat from the oxidized exhaust to the air stream, and
the cathode supply line is configured to supply a heated air stream output from the heat exchanger to the cathode of the first fuel cell.

11. The fuel cell system of claim 1, wherein the anode of the fuel cell is configured to receive a mixed fuel stream including the portion of the hydrocarbon feed and a portion of the anode exhaust stream that has been recycled.

12. The fuel cell system of claim 11, further comprising an external reformer configured to reform the mixed fuel stream before being introduced into the fuel cell.

13. The fuel cell system of claim 11, wherein the fuel cell is configured to internally reform the mixed fuel stream by converting methane and water to hydrogen and carbon dioxide.

14. The fuel cell system of claim 11, wherein the fuel cell comprises a plurality of unit cells connected to form a fuel cell stack.

15. The fuel cell system of claim 11, further comprising a first blower configured to direct the mixed fuel stream to the anode of the fuel cell.

16. The fuel cell system of claim 15, further comprising a first heat exchanger configured to heat the mixed fuel stream before being introduced into the fuel cell.

17. The fuel cell system of claim 16, wherein the electrolyzer cell is a molten carbonate electrolyzer cell, and the fuel cell system further comprises:
an air supply line coupled to the molten carbonate electrolyzer cell;
a second heat exchanger coupled to the air supply line; and
a second blower configured to direct an air stream through the air supply line and the second heat exchanger to the molten carbonate electrolyzer cell, wherein the second heat exchanger is configured to heat the air stream before the air stream is introduced into the molten carbonate electrolyzer cell.

18. A fuel cell system comprising:
a fuel cell having a cathode and an anode configured to receive a portion of a hydrocarbon feed and to output an anode exhaust stream comprising carbon dioxide, hydrogen, and water;
an electrolyzer cell having a cathode and an anode, wherein the anode of the electrolyzer cell is configured to receive a first portion of the anode exhaust stream and another portion of the hydrocarbon feed, and to generate a hydrogen stream, wherein the hydrogen stream comprises at least 70% hydrogen;
an anode gas oxidizer configured to oxidize a gas stream comprising a second portion of the anode exhaust stream and to output an oxidized exhaust;
a heat exchanger configured to receive an air stream and the oxidized exhaust, and to transfer heat from the oxidized exhaust to the air stream;
a cathode supply line configured to supply a heated air stream output from the heat exchanger to the cathode of the fuel cell; and
a proton-exchange membrane fuel cell configured to receive at least a portion of the hydrogen stream, wherein:
the proton-exchange membrane fuel cell is configured to output an exhaust stream; and
the gas stream oxidized by the anode gas oxidizer comprises the exhaust stream of the proton-exchange membrane fuel cell.

* * * * *